May 23, 1933.   B. D. HETRICK   1,910,218
TAG
Filed Jan. 7, 1932
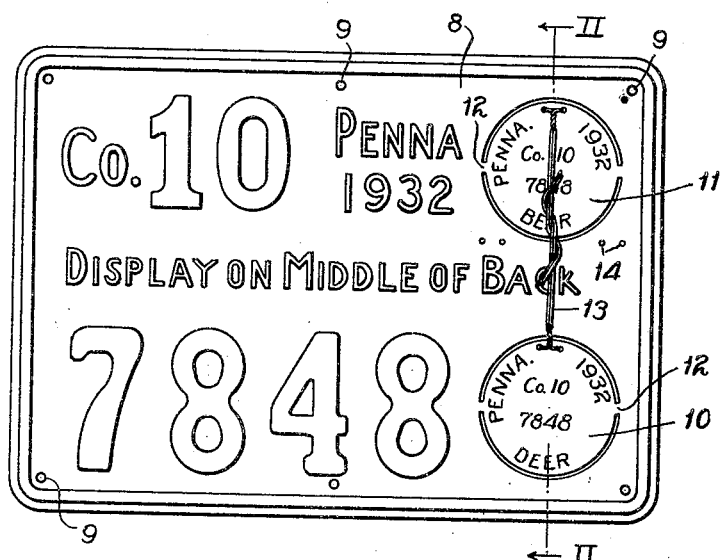
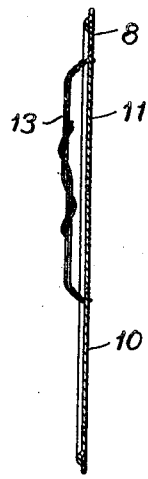
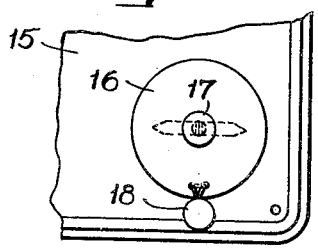
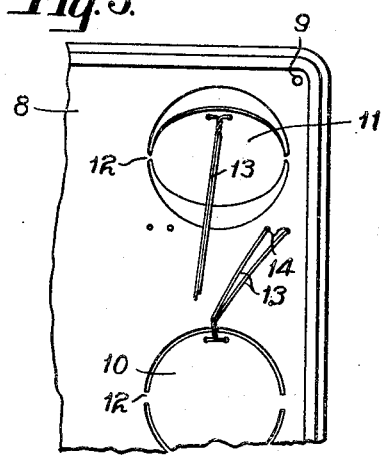
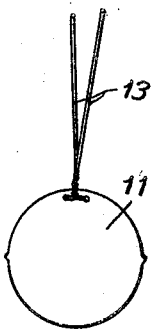
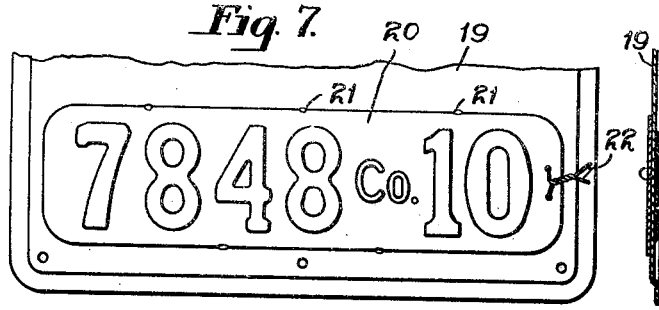

Patented May 23, 1933

1,910,218

UNITED STATES PATENT OFFICE

BERNARD D. HETRICK, OF BUTLER, PENNSYLVANIA

TAG

Application filed January 7, 1932. Serial No. 585,248.

My invention relates to license plates, tags, etc., and is hereinafter described as employed in connection with hunting licenses, although it will be understood that the invention may be put to various other uses.

In many states, a hunter is permitted to kill only a limited number of game animals and birds. For example, each hunter may be permitted to shoot one deer or one bear, but there has been no convenient method of definitely determining whether a hunter has killed his allotment and which would prevent a hunter shooting game in one district, and then going to another district and shooting game in excess of the number permitted by law.

One object of my invention is to provide a means for more effectively insuring against hunters killing more game than permitted by law.

In order to effect this object, I utilize license plates similar to those commonly employed, and which must be constantly worn by the hunter when hunting, but which contain, formed integrally therewith or otherwise, identification tags each of which permits the shooting of one game animal or bird, and each carrying an identification mark similar to that on the main body of the plate. The small identification tag must be placed on the animal killed by the hunter, before removing the animal from the place of kill, so that game wardens may have means of ascertaining whether the game has been legally killed. The tag is so affixed to the plate that the removal thereof will make it apparent on casual view that the hunter has shot his allotment, or at least a part of his allotment.

If identification tags have been removed from the plate, the license becomes thereby automatically cancelled as to game of the class identified with the tag.

Some of the forms which my invention may take are shown in the accompanying drawing wherein Figure 1 is a face view of a license plate containing identification tags; Fig. 2 is a view taken on the line II—II of Fig. 1; Fig. 3 shows one of the tags partially removed from the plate; Fig. 4 shows a tag as it appears when completely removed; Fig. 5 is a fragmentary view showing a portion of a license plate and another form of identification tag; Fig. 6 is a sectional view thereof; Fig. 7 shows still another modification of a license plate and tag, and Fig. 8 is a sectional view thereof.

Referring first to Figs. 1 to 4, the plate 8 may be of sheet metal or any other suitable material, and contains the usual markings as to county, state, year and license number. Holes 9 are provided at various points near the edges of the plate for attachment thereof to a hunting coat or the like. Removable tag portions 10 and 11 are formed integrally with the plate 8 and may be rendered conveniently removable therefrom by weakened lines which define the marginal edges of such tags. These lines may be formed by a die or in any other suitable manner.

As shown in the drawing, the metal is cut through along such marginal lines, except for small web portions 12, which permit the tag to be pushed to the position shown in Fig. 3, by the fingers of the user, and without the use of tools, to thereby permit convenient separation of the tag from the plate when an animal or bird has been shot. The tags bear license numbers and data corresponding to those on the main body of the plate, and carry wires 13 by which they may be attached to the game killed.

Holes 14 may be provided in the plate 8 for the reception of the ends of the wires 13, as desired. The plate is shown as containing a tag for a bear and a tag for a deer, but it will be understood that suitable modifications can be conveniently made, as by providing two or more tags for deer, bears, or other game.

In Figs. 5 and 6, I show a plate 15, and a separately formed tag 16, the tag corresponding to the tags 10 and 11, but being attached to the plate by a conveniently removable rivet 17. This rivet 17 may be utilized to attach the tag to the game. The tag 16 is attached also to the plate by means of a seal 18 which must be broken to remove the tag, and serves to prevent reattachment of the tag to the plate or a substitution therefor.

When the tags 10—11 have been removed from the plate 8, the license represented by such plate is thereby automatically cancelled, at least so far as the right to kill such game as is represented by the removed tags is concerned, and the termination of such license as to such game is readily apparent to a game warden. The same is true as to removal of the tag 16, since removal of the tag will leave a blank space on the plate 15.

In Figs. 7 and 8, a plate 19 is provided with a tag 20 which is suitably detachably secured thereto, as by means of spot welding at the points indicated at 21, soldering at points along the edge of the tag, or in any other desired manner.

The tag is preferably attached to the plate before die stamping and painting of the plate, so that the license numbers and data will be formed in each. Of course, the unpainted portion of the plate covered by the tag will be exposed upon removal of the tag for use to mark game, thereby making the removal of the tag obvious and automatically cancelling the license to kill more game represented by such tag. If desired, the portion of the plate covered by the tag may be painted a color that distinguishes from the color of the remaining portion of the plate. The tag 20 may carry a wire 22 by which it may be conveniently attached to the game killed.

It will be understood that the tags may be of various other forms than those shown, and that they may be shaped to represent the game licensed thereby.

The placing of the tags within the lateral confines or between the edges of the plate reduces danger of their being accidentally torn from the plate, and this is particularly true with respect to the tags 10 and 11 which are formed directly in the body of the plate.

I claim as my invention:—

1. A license plate or the like having identification marks and weakened lines formed within the marginal edges of the plate, to define a tag portion and permit removal thereof.

2. A license plate or the like having identification marks and weakened lines formed within the marginal edges of the plate to define a tag portion and permit removal thereof, the said weakened lines defining the marginal edges of the tag portion, and the plate being cut entirely through along said lines, except for short distances at opposite edges of the tag portion.

In testimony whereof I, the said BERNARD D. HETRICK have hereunto set my hand.

BERNARD D. HETRICK.